3,269,187
DIFFERENTIAL PRESSURE TRANSDUCER
Peter R. Perino, Northridge, Calif., assignor to Statham Instruments, Inc., Los Angeles, Calif., a corporation of California
Filed Mar. 22, 1963, Ser. No. 267,169
8 Claims. (Cl. 73—398)

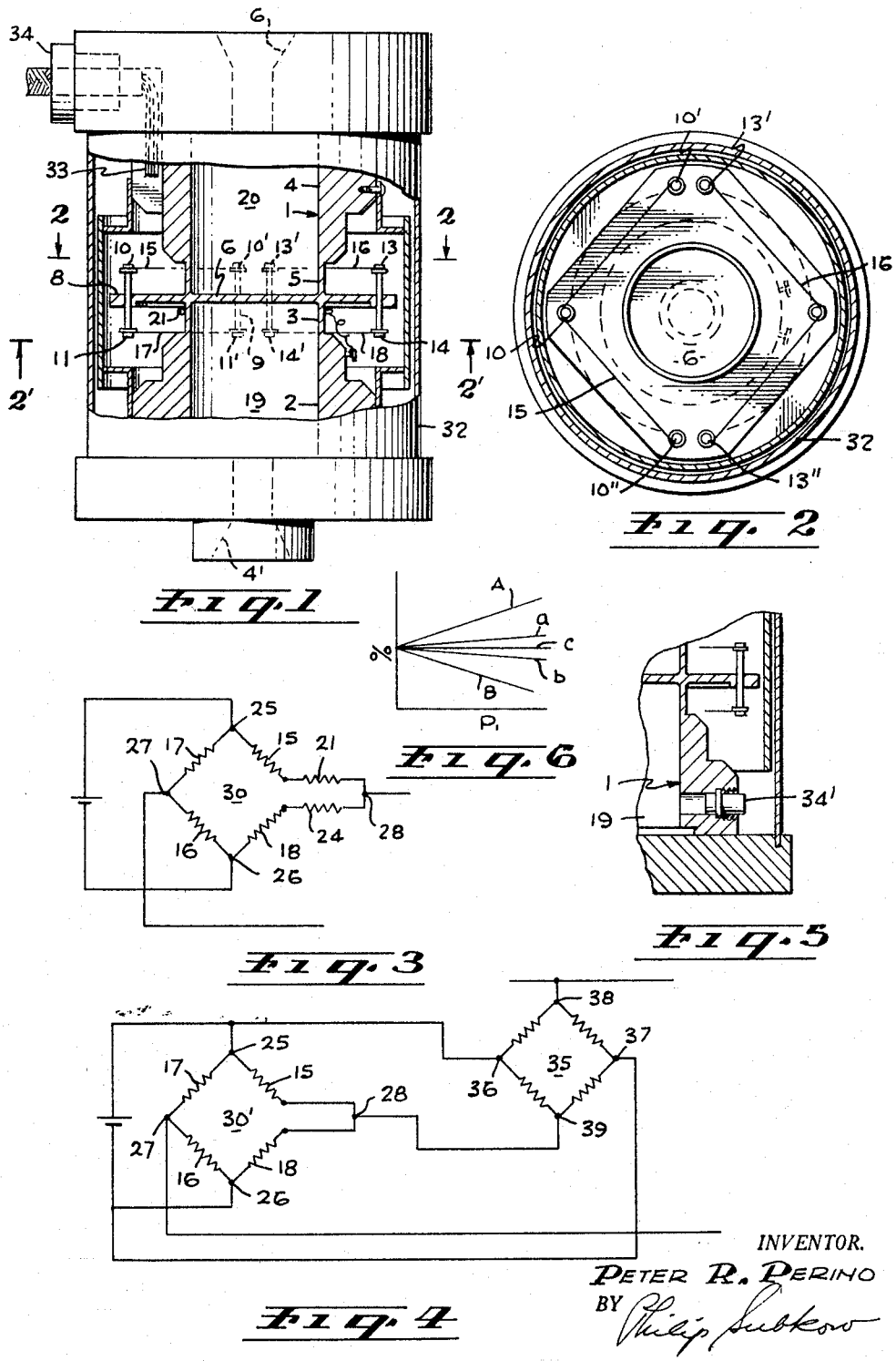

This invention relates to transducers which sense the difference between two conditions to be sensed by the transducer, where the response of the transducer may be affected not only by the difference between the conditions, but also by the magnitude of one or the other of the said conditions.

Many transducers are arranged to respond to the magnitude of the condition or a plurality of conditions to be sensed, and depend on the movement of a motion-transmitting linkage which is displaced as a function of such condition or conditions. Where the transducer is to report accurately the difference between two conditions, it is necessary that the displacement of the linkage be sensibly zero when the difference between the two conditions is sensibly zero. Where the displacement of the linakge is influenced by a force-summing means, subject to each of the conditions, and which is affected by the condition sensed, and transmits opposing forces to the linkage, it is necessary, for the displacement to be substantially zero when the difference between the conditions to be sensed is zero, that the opposing forces imposed on the force-summing means, which influence the movement of the motion-transmitting linkage, are substantially the same.

One example of such a transducer is a differential pressure gage. In such gages, one condition, i.e., the pressure $P_1$, is exerted on a diaphragm which acts as a force-summing means, and another condition, i.e., pressure $P_2$, is exerted on the reverse side of the same diaphragm or on another diaphragm. The motion of the diaphragms, when the pressures are exerted on the obverse and reverse side of the diaphragm, is transmitted to a motion-sensing means. In the case where the pressures are exerted on different diaphragms, these diaphragms are linked, and the motion of the linkage is transmitted to the motion-sensing means.

The displacement of the linkage to the motion-sensing means is related to the pressure as follows:

$$P_1 A_1 - P_2 A_2 = Kx$$

when $P_1$ is the pressure against a diaphragm of area $A_1$, and $P_2$ is the pressure exerted against a diaphragm of the area $A_2$, and K is the stiffness of the system, including the sensing means and the diaphragm system, and $x$ is the displacement of the motion-transmitting member, which transmits the net deflection of the diaphragms to the sensing means. The zero of the instrument is understood to be the value of the displacement $x$ when $P_1=P_2$. Ideally, if $A_1=A_2$, the zero is actually zero value of $x$ when $P_1=P_2=0$.

It is apparent that, if $A_1 \neq A_2$, then there will be a net finite displacement $x$, even though $P_1=P_2$; and the transducer will report a displacement as if $P_1$ were greater than $P_2$ or vice versa, as if $P_2$ were greater than $P_1$. The zero of the instrument thus is a finite displacement $x$. This zero, i.e., the finite displacement, will be sensibly proportional to $P_1$. The zero thus shifts as $P_1$ is changed, even though $P_1=P_2$ at all values of $P_1$.

As a practical matter, it is extremely difficult to balance systems so that $x=0$ and $P_1=P_2$, particularly when $P_1$ is very large as compared to $P_1-P_2$. This requires a degree of precision in the construction of the diaphragm system, and also the assurance that the displacement of the diaphragms both be transmitted either completely or in the same percentage of its displacement to the sensing means. This, in many cases, is either not possible or introduces large elements of cost in construction. Additionally, changes in temperature result in expansions and contractions which also introduce inequalities in the diaphragm areas. All of these factors effect the equally of $P_1A_1$ and $P_2A_2$, when $P_1=P_2$. Thus, a finite error is introduced into the system, i.e., there is a zero shift, that is, a displacement $x$, when $P_1=P_2$.

Thus, in such pressure gages used to measure the differences in pressures at two points in the fluid stream, the gage reports the displacement $x$, which is not only a function of the differential pressure, but also of higher upstream pressure, i.e., the line pressure.

It is an object of my invention to produce a device, such as a transducer, in which the transducer will report the differences in the condition sensed, for example, the values of $P_1-P_2$, substantially independent of the values of $P_1$. In such transducers, where there is a zero shift due to variations in $P_1$ or $P_2$, I provide for compensation to eliminate the influence of $P_1$ or $P_2$.

In many types of transducers, the displacement of the motion-transmitting linkage modifies the impedances of a Wheatstone bridge, and the electrical output of the bridge is thus a measure of the displacement. In the above case, where the displacement is influenced both by the differences in the conditions to be sensed, for example, $P_1-P_2$, and also by the magnitude of one of the conditions, for example, $P_1$ or $P_2$, as described above, the electrical output of the bridge is a function of the magnitude of the aforesaid difference, e.g., $P_1-P_2$, and the magnitude of one of the conditions, e.g., $P_1$ or $P_2$.

It is an object of my invention, in such transducers, to modify the output of the bridge by electrically and algebraically adding (either adding or subtracting) from the output of the Wheatstone bridge a voltage increment, or algebraically adding an impedance change to one or more of the four resistors of the bridge which is in magnitude equal and opposite to the influence of the condition, e.g., $P_1$, on the output, and thus to obtain an electrical output from the bridge which is a function of the difference between the conditions to be sensed, for example, $P_1-P_2$, substantially unmodified by the condition, for example, $P_1$ or $P_2$. I accomplish this result by employing two transducer elements which modify the impedances of the Wheatstone bridge circuit system. One of the transducer elements is made responsive to the effect of the difference between the two conditions, e.g., $P_1-P_2$, and also, due to the physical limitations previously mentioned to one of the condiitons, for example, $P_1$ or $P_2$.

I employ a second transduction element which modifies another impedance element, which then is associated with the first Wheatstone bridge to affect its output. This second transduction element is made responsive to one only of the conditions, e.g., $P_1$ or $P_2$. I combine impedance so that the net voltage output of the circuit system is responsive to substantially only the value of the differences in the condition, e.g., $P_1-P_2$.

If the Wheatstone bridge system associated with the transducer affected by the differences of the condition, e.g., $P_1-P_2$, and substantially unaffected by either $P_1$ or $P_2$, $P_1-P_2=\Delta P=K_1 e_1 v$, where $K_1$ is a proportionality factor, $e_1$ is the output of the bridge, and $v$ is the voltage input to the bridge.

For a Wheatstone bridge circuit:

$$\frac{e_1}{v} = \frac{\Delta R_1}{R}$$

where $\Delta R_1$ is the change in impedances, for example, the resistance of each of the four resistors of the Wheatstone bridge, all of which have a resistance value R.

If, however, the system is not mechanically balanced, there will be an output $e_2/v$, which is a function of the pressure $P_1$, superimposed upon the output $e_1/v$, which is proportional to the pressure $\Delta P$. Thus, the bridge output at any pressure $P_1$, is given by the following equation:

$$\left(\frac{e}{v}\right) = \frac{\Delta R}{R} = \left(\frac{e_1}{v}\right)\Delta P + \left(\frac{e_2}{v}\right)P_1 = \frac{\Delta R_1}{R} + \frac{\Delta R_2}{R} \cdots \quad (1)$$

where $\Delta R_1$ is the contribution to the change in resistance $\Delta R$ of the arms of the Wheatstone bridge due to the differential pressure, and $\Delta R_2$ is the contribution to the change in resistance $\Delta R_2$ arising from the exertion of the pressure $P_1$.

$$\left(\frac{e_1}{v}\right)\Delta P$$

is the contribution to the output due to the differential pressure; and $$\left(\frac{e_2}{v}\right)P_1$$

is the contribution to the output due to the pressure $P_1$. Thus, $$\left(\frac{e_1}{v}\right)\Delta P$$

and $\Delta R_1/R$ are functions only of the differences in pressure, and $$\left(\frac{e_2}{v}\right)P_1$$

and $\Delta R_2/R$ are functions of the pressure only. It will thus be seen that, keeping $P_1$ constant, $e/v$ will change with $\Delta P_1$.

Since the gage is usually designed to report up to a maximum of the $\Delta P$ for which it is designed, the output $e/v$, at the above maximum value of the $\Delta P$, with $P_1$ held constant at ambient pressure, is termed the full range output $(e/v)FR$.

In order to make the bridge output independent of $P_1$, we must either make the contribution of the line pressure zero, i.e., reduce $\Delta R_2$ to zero, or introduce the term into the bridge equation equal and opposite to $\Delta R_2/R$. The former of these two solutions is obtained by making the diaphragm areas substantially equal, with the difficulty described above. The second of these solutions is the subject of my present invention.

I compensate this error due to the presence of $\Delta R_2$ by modifying the impedance of one or more than one of the arms of the bridge, so as to reduce this error value to a desired low value and, ideally, to eliminate it. Ideally, the bridge is balanced, and no electrical output is obtained when energized by desired range of the conditions, e.g., $P_1$ or $P_2$, so long as the difference between the conditions is substantially zero, e.g., $\Delta P = 0$. I accomplish this objective by introducing a second condition-sensing transducer which is responsive to one of the conditions and not to difference between the conditions. Thus, for example, in the differential pressure gage, a second pressure-sensing element is placed either at the pressure $P_1$ or at the pressure $P_2$. I connect the condition-sensing elements of the transducers so as to vary the impedances of a Wheatstone bridge, for example, a strain wire or a strain wire in a bridge configuration. The strain wires are thus in a circuit including a Wheatstone bridge. In such manner, the second gage, responsive to one of the conditions only, modifies the output of the Wheatstone bridge of the transducer responsive to the difference between the conditions to eliminate the influence of the condition on the output affected by the difference between the conditions. For example, the differential pressure gage varies the impedances of a Wheatstone bridge, and the second pressure gage modifies the same Wheatstone bridge by adding or subtracting impedances from the bridge associated with the differential pressure gage. The net output is thus responsive to differential pressure only and substantially independent of the pressure $P_1$ or $P_2$.

In this manner, the Wheatstone bridge differential pressure gage will be at a substantially constant level of balance, for example, with substantially zero output, irrespective of the level of the line pressure, whenever the differential pressure is substantially zero, and will report the differential pressure accurately, irrespective of the level of the line pressure.

The system of my invention thus permits of an electrical compensation of the error in the response of the transducer which results from the magnitude of one of the conditions on the effect of the difference between the conditions. This results in a transducer response which is substantially independent of the magnitude of the conditions to be sensed, and the substantial effect is dependent only on the difference between the conditions.

The above invention may be applied to various forms of differential pressure gages, and the following illustrates one form of differential pressure gage to which my invention may be applied.

These and other objects of my invention will be further understood by reference to the drawings, of which:

FIG. 1 is a cross-sectional view, partly in elevation, of one form of the differential pressure gage;

FIG. 2 is a section taken on line 2—2 of FIG. 1;

FIG. 3 is a schematic wiring diagram of the Wheatstone bridge of FIG. 1;

FIG. 4 is a schematic wiring diagram of the Wheatstone bridge system of FIG. 4; and FIG. 5 is a modification of the system of FIG. 1;

FIG. 6 is a chart illustrating a principle of my invention.

FIG. 1 illustrates a form of differential pressure gage more fully described in the Di Giovanni Patent 2,958,056, to which reference may be had for further description.

The tubular member 1 is formed of rigid portions 2 and 4 and thin-walled, reduced circumambient flexure sections 3 and 5. The diaphragm 6 is integrally formed with, or is welded to, the reduced sections 3 and 5, which form a flexible, circumambient wall, and the diaphragm extends across the interior of the tubular member between the chambers 19 and 20 and projects outwardly exteriorly of the tubular member, to produce overhanging section 8. Pressure is applied to chamber 19 through inlet 4' and to chamber 20 through inlet 6. The insulating sapphire pins 9 are positioned in the overhanging portion 8, to extend upwardly and downwardly from the diaphragm section 6 equal distances.

The pins 9 are capped with metallic caps 10, 10' and 10'' at the upper end of pins 9, and 11, 11' and 11'' in the lower ends of the pins; and caps 13, 13' and 13'' are connected to the upper ends and 14, 14' and 14'' to the lower ends of the pins. Caps 14'' and 11'' do not appear in the drawings, FIG. 1, but are positioned on the other ends of the pins on which caps 10'' and 13'' are positioned.

FIG. 2 illustrates the configuration viewed through a section on line 2—2. The configuration when viewed along the section on line 2'—2' is identical. Electrical resistance strain wires are electrically and mechanically connected to the caps; thus, wire 15 is connected to pin 10' and stretched in tension and connected to cap 10, and from cap 10 is stretched in tension and connected to 10''. In like manner, the wire 16 is stretched between 13', 13 and 13'', and the wire 17 is stretched from the pins 11', 11 and 11''. In like manner, the wire 18 is stretched from cap 14' to cap 14 to cap 14''.

The external wall of the flexure carries similar electrical resistance strain wire 21. It is carried on this flexible, circumambient flexure 3 by the conventional bonded strain wire techniques used in cementing the electrical resistance strain wire to members which are to undergo deflection. Any of these techniques may be used; for example, circumambient wall 3 may be covered with an epoxy resin and thus insulated from the wire 21, and the wire 21 is bonded to the circumambient wall 3 by means of this epoxy resin. An insulating paper may be positioned between the wall 3 and the wire and all glued to the wall in a manner similar to that employed in the bonded strain wire gages.

The wires 15, 16, 17 and 18 and the wire 21, and a resistance wire 24, which is not subjected to stress variation or changes in resistance, are mounted within the case 32 of the device, and are connected as shown in FIG. 3 to conduits shown at 33 to the terminal 34. The bridge 30 is assumed balanced by resistors 21 and 24, when both $\Delta P$ is zero and $P_1$ is ambient pressure.

FIG. 5 shows a variation of the structure of FIG. 1. In that case, the wire 21 is not used. In place thereof a transducer 34' is positioned in the wall 1 and subjected to the pressure in chamber 19. Any conventional strain gage transducer may be employed. This transducer is a pressure gage and not a differential pressure gage, and any one of the pressure gages described in the above-mentioned patent may be employed.

Other examples are the gages described in Patents 2,622,176; 2,751,476; and 2,760,037.

The Wheatstone bridge circuit of transducer 34' is illustrated and its association with the transducer bridge circuit of FIG. 1 is shown in FIG. 5. As will be seen, the resistance element 21 and its balancing resistor 24 are omitted. The bridges 30' and 30 are assumed to be balanced when $\Delta P$ is zero and the pressures $P_1$ and $P_2$ are ambient pressures. The input to the bridge corners 25 and 26 are in parallel with the input to corners 36 and 37 of the bridge 35 of the transducer 34'.

The output corners 27 and 28 of bridge 30' are in series with the output corners 38 and 39 of the bridge 35.

Considering the bridge 30 of FIG. 3, when pressure is applied to inlet 4' and inlet 6, so that $P_1$ is exerted at 4', and the lower pressure $P_2$ is exerted through 6, the higher pressure in chamber 19 will cause the structure to deflect so that the diaphragm 6 is bowed outwardly toward the chamber 20, and the overhanging portion of the diaphragm will deflect downwardly toward the chamber 19, thus rotating the pins 9 so that the wires 15 and 16 are increased in tension, while the wires 17 and 18 are decreased in tension. At the same time, the wire 21 is also subjected to an increase in tension due to the deflection of the thin-walled flexure 3, as a result of the pressure in chamber 19. If the resistances 15, 16, 17 and 18 are equal to R, and the resistance $R_3$ of the wire 21 is equal to the resistance of wire 24, and the change in the resistance of 15, 16, 17 and 18 are all equal to $\Delta R$, and the change in the resistance $R_3$ of the wire 21 is $\Delta R_3$, then the output $e_3/V$ of the bridge measured across the output, measured between the output corners 27 and 28, when the input voltage across 25 and 26 is equal to V, is given by the following equation:

$$\frac{e_3}{V} = \left(\frac{\Delta R}{R}\right)' + \frac{1}{4}\frac{\Delta R_3}{R+R_3} \cdots \quad (2)$$

where $$\left(\frac{\Delta R}{R}\right)' = \frac{1}{2}\left(\frac{\Delta R}{R} + \frac{\Delta R}{R+R_3}\right)$$

$(\Delta R/R)'$ reflects the decrease in output due to the addition of $R_3$ (wire 11) and wire 24 to one side of the bridge. If $R \gg R_3$, this decrease in sensitivity is negligible.

Referring to Equation 1, it will be seen that the following results:

$$\frac{e_3}{V} = \left(\frac{\Delta R_1}{R}\right)' + \left(\frac{\Delta R_2}{R}\right)' + \frac{1}{4}\frac{\Delta R_3}{R+R_3} \cdots \quad (3)$$

It will be seen that if $$\left(\frac{\Delta R_2}{R}\right)' = \frac{1}{4}\frac{\Delta R_3}{R+R_3} \cdots \quad (4)$$

then, $$\frac{e_3}{V} = \left(\frac{\Delta R_1}{R}\right)' \cdots \quad (5)$$

which, as can be seen, is the contribution of the effect of differential pressure only on the output of the Wheatstone bridge, and thus is dependent only on the differential pressure and is independent of the pressure $P_1$.

In order to evaluate the resistances $R_3$ and $\Delta R_3$ required, I first calibrate the differential transducer by omitting the resistors 21 and 24. With $P_1 = P_2$ I vary the pressure $P_1$ and measure the output of the bridge and various values of $P_1$.

As will be seen from Equation 1, since $\Delta R/R$ is zero, since the contribution of the differential pressure is zero:

$$\left(\frac{e}{v}\right) = \frac{\Delta R_2}{R}$$

and, since $\Delta R_2/R$ is proportional to $P_1$:

$$P_1 = \frac{K\Delta R_2}{R} = K\left(\frac{e_2}{V}\right)_{P1} \cdots \quad (6)$$

FIG. 6 is a plot of the $$P_1 = K\left(\frac{e_2}{V}\right)_{P1} / \left(\frac{e}{V}\right)_{FR} \times 100 \cdots \quad (7)$$

That is, the deviation in output as a percentage of the full range output $$\left(\frac{e}{V}\right)_{FR}$$

when $P_1$ is varied and $\Delta P$ held constant at 0 p.s.i.d. (i.e., zero shift versus line pressure).

If the deviation is positive, i.e., K is positive, the deviation follows line A of FIG. 6; and if K is negative, it will follow line B, since:

$$P_1 = K\left(\frac{e_2}{V}\right)_{P1} = K\left(\frac{\Delta R_2}{R}\right) \cdots \quad (8)$$

Thus $$\left(\frac{e_2}{V}\right)_P \text{ and } \left(\frac{\Delta R_2}{R}\right)$$

and K may be evaluated knowing $P_1$.

Having established $\Delta R_2/R$ as a function of $P_1$, I then measure the resistance of resistor $R_3$ as a function of $P_1$, keeping $P_1$ and $P_2$ equal. This gives me the value of $\Delta R_3$ as a function of $P_1$:

$$P_1 = K_1(\Delta R_3)$$

Knowing $P_1$ and $\Delta R_3$, $K_1$ is evaluated.

I then adjust the value of $R_3$ such that $$\left(\frac{\Delta R_2}{R}\right)' = \frac{1}{4}\frac{\Delta R_3}{R+R_3} \cdots \quad (9)$$

$R_3$ is adjusted, as required, to satisfy the equality of Equation 9. This adjustment of $R_3$ can be made by electrically paralleling or series a non-strain sensitive resistor with $R_3$ or by physically changing $R_3$ to required value.

If the value of K is positive, that is, if the variation of the voltage output increases with increase in pressure (see line A, FIG. 6), I introduce the resistance 21 in series with resistances whose resistance decreases, that is, in series with either 17 or 18. If the value of K is negative, for instance, if it follows line B, FIG. 6, I introduce the resistor in series with the resistance which increases as pressure is applied, as shown in FIG. 3. Thus, the resistance change in the resistor $R_3$ is made to be of opposite direction to the resistance change in the resistor with which it is in series.

Thus, from Equation 1 and Equation 3, since:

$$\left(\frac{\Delta R_2}{R}\right)' = \frac{1}{4}\frac{\Delta R_3}{R+R_3} \cdots \quad (10)$$

Thus, $$\frac{e_3}{V} = \left(\frac{\Delta R_1}{R}\right)' \pm \left(\frac{\Delta R_2}{R}\right)' \mp \frac{1}{4}\frac{\Delta R_3}{R+R_3} \cdots \quad (11)$$

FIG. 3 illustrates an alternative method of compensation. It will be seen that the four resistors R of bridge 30', with 35 not connected, may be considered to be made up of two voltages.

$$E = E_1 + E_2$$

Where:

$$E_1 = V\left(\frac{\Delta R_4}{R}\right) \text{ and } E_2 V\left(\frac{\Delta R_5}{R}\right) \cdots \quad (12)$$

where $V(\Delta R_4/R)$, i.e., $E_1$ is a function of $\Delta P$ only and $E_2$, i.e., $V(\Delta R_5/R)$ is a function of $P_1$ only.

Thus, the bridge output voltage, as previously, is as follows:

$$E = V\left(\frac{\Delta R_4}{R}\right) + V\left(\frac{\Delta R_5}{R}\right) = E_1 + E_2 \cdots \quad (13)$$

The second bridge output of bridge 35, also having four resistors R, is a function of $P_1$ only and is given by the following:

$$E_3 = V\left(\frac{\Delta R_6}{R}\right) \cdots \quad (14)$$

By making $E_3 = -E_2$, i.e.:

$$\left(\frac{\Delta R_5}{R}\right) = -\left(\frac{\Delta R_6}{R}\right) \cdots \quad (15)$$

and combining the bridges as in FIG. 4, the following results:

$$E_4 = E + E_3 = E_1 + E_2 + E_3$$

$$= V\left(\frac{\Delta R_4}{R}\right) + V\left(\frac{\Delta R_5}{R}\right) + \left(\frac{\Delta R_6}{R}\right)$$

And thus, $$E_4 = E_1 = V\left(\frac{\Delta R_4}{R}\right) \cdots \quad (17)$$

And thus, $E_4$ is a function of $\Delta P$ only.

Thus, in both cases, i.e., FIG. 3 and FIG. 5, the output $P=0$ will be along the line C of FIG. 6.

It is apparent that, depending on the degree of equality of Equation 9 or 15, the output, as in Equations 3 and 11, may be a finite value instead of 0, as $P_1$ increases with $\Delta P=0$. We may set this finite value as any percentage of the value of the output at the maximum value of $\Delta P$ to be measured and at the maximum value of the line pressure to which the transducer is to be exposed, i.e., as a percentage of the full scale output. Thus, if this be 1% of the maximum value of $P_1$, then the degree of equality is thus determined. Thus, as is illustrated by lines $a$ and $b$ in FIG. 6, schematically drawn to illustrate $\pm 1\%$, the output as a function of $P_1$, with $\Delta P=0$, will lie between lines $a$ and $b$, depending on the direction of the unbalance.

While I have described particular embodiments of my invention for the purpose of illustration, it should be understood that various modifications and adaptations thereof may be made, within the spirit of the invention, as set forth in the appended claims.

I claim:

1. A pressure transducer responsive to the difference between two pressures and substantially independent of the magnitude of said pressures, which comprises electrical resistance strain wires arranged in a Wheatstone bridge, a force-summing means to which said difference in said pressures is applied, a connection between said force-summing means and said strain wires responsive to said difference, to alter the tensions in said wires, and a second strain wire means resposive to one only of said pressures to alter the tension in said strain wire, said last-named wire electrically connected to said first-mentioned strain wires, whereby the impedance of said second-mentioned wire modifies the voltage difference of said Wheatstone bridge.

2. In the pressure gage of claim 1, said last-named strain wire is in series with one of said electrical strain wires of said Wheatstone bridge.

3. A differential pressure gage which comprises force-summing means responsive to two pressure sources and responsive to the difference in said pressures, an electrical impedance means connected in a Wheatstone bridge circuit, said force-summing means altering the impedance means of said Wheatstone bridge to produce a voltage difference at said Wheatstone bridge responsive to said difference in pressure, a second force-summing means responsive to one only of said pressure sources, a second impedance means, said second force-summing means altering said last-named impedance means, said last-named impedance means electrically connected to said Wheatstone bridge whereby the said last-named impedance modifies the voltage difference of said Wheatstone bridge.

4. In the pressure gage of claim 3, the impedances of said Wheatstone bridge are electrical resistance strain wires whose tensions are altered by said force-summing means responsive to said difference in pressure, and said second impedance, whose impedance is responsive to said one pressure, is a second Wheatstone bridge whose impedances are electrical resistance strain wires whose stresses are altered by said second force-summing means, responsive to said one pressure, the input corners of said bridges being electrically connected in parallel and the output corners of said Wheatstone bridges being electrically connected in series.

5. The differential pressure gage of claim 4, in which the resistance values of the strain wires forming each of said bridges, and the change in resistance $\Delta R_5$ of the resistance of the wires of the first mentioned bridge and the change in resistance $\Delta R_6$ of the wires of said second mentioned bridge when no differential pressure is exerted but said one pressure is exerted and said bridges are energized are of such value that the potentials at the output corners of one of said bridges substantially equally and opposite in sign to that of other of said bridges.

6. The differential pressure gage of claim 3, in which said second impedance means is in series with one of the impedances connected in said Wheatstone bridge.

7. The differential pressure gage of claim 6, in which said first and second impedance means are electrical resistance strain wires.

8. The differential pressure gage of claim 7, in which the resistance of the wires of said bridge is R and the resistance of said strain wire forming said second impedance means is $R_3$, and the change in said stress in said last named impedance means is $\Delta R_3$, and $\Delta R_2$ is the change resistance of the wires of said bridge when the differential pressure is substantially zero and one of said pressures is exerted on said first named force summing means to give a finite value to the value of $\Delta R_3$, the value of the resistance $R_3$ is substantially that given by the following equation $$\frac{\Delta R_2}{R} = \frac{1}{4}\frac{\Delta R_3}{R+R_3}$$

and is connected to said bridge so that the change in resistance of said second wire is opposite to the change in resistance in the wire of said first mentioned bridge to which said strain wire forming said second impedance means.

References Cited by the Examiner

UNITED STATES PATENTS

| | | | |
|---|---|---|---|
| 2,720,113 | 10/1955 | Statham | 73—407 X |
| 2,740,295 | 4/1956 | Perchonok | 73—407 X |
| 2,767,974 | 10/1956 | Ballard et al. | 73—398 |
| 2,771,579 | 11/1956 | Ruge | 73—88.5 X |
| 2,801,388 | 7/1959 | Ruge | 73—88.5 |
| 3,090,229 | 5/1963 | Howard | 73—398 |
| 3,105,564 | 10/1963 | Ormond | 73—88.5 X |

LOUIS R. PRINCE, *Primary Examiner.*

DAVID SCHONBERG, *Examiner.*

ERNEST F. KARLSEN, DONALD O. WOODIEL,
*Assistant Examiners.*